US012272931B1

(12) United States Patent
Zakershobeiri et al.

(10) Patent No.: US 12,272,931 B1
(45) Date of Patent: Apr. 8, 2025

(54) MODULAR ELECTRICAL PANEL FOR CONTROLLING POWER USAGE

(71) Applicant: FUTURi Power Inc., Vancouver (CA)

(72) Inventors: Mohammad Amin Zakershobeiri, Vancouver (CA); Glenn Stuart Fawcett, Vancouver (CA)

( * ) Notice: Subject to any disclaimer, the term of this patent is extended or adjusted under 35 U.S.C. 154(b) by 0 days.

(21) Appl. No.: 18/919,161

(22) Filed: Oct. 17, 2024

(30) Foreign Application Priority Data

Jun. 28, 2024 (CA) .................................. CA 3244832

(51) Int. Cl.
  *H02B 1/01* (2006.01)
  *H02B 1/056* (2006.01)
  *H02B 1/20* (2006.01)
  *H02B 1/24* (2006.01)

(52) U.S. Cl.
  CPC .............. *H02B 1/056* (2013.01); *H02B 1/20* (2013.01); *H02B 1/24* (2013.01)

(58) Field of Classification Search
  None
  See application file for complete search history.

(56) References Cited

U.S. PATENT DOCUMENTS

| | | | |
|---|---|---|---|
| 11,309,690 B2 * | 4/2022 | Santore | H02H 1/0007 |
| 12,030,398 B2 * | 7/2024 | Youssefzadeh | B60L 53/30 |
| 2015/0103454 A1 * | 4/2015 | Schripsema | H02H 1/0015 |
| | | | 361/63 |
| 2018/0003746 A1 * | 1/2018 | Patel | G01R 35/00 |
| 2023/0120453 A1 * | 4/2023 | Rao | H04L 12/2838 |
| | | | 340/4.3 |

* cited by examiner

Primary Examiner — Courtney L Smith
(74) Attorney, Agent, or Firm — Damien G Loveland; Valuetech Patent Agency Inc.

(57) ABSTRACT

Electrical panels sometimes need to be upgraded or new ones installed to cope with increased power demands, and new buildings often require differently configured panels. The smart electrical panel herein has a modular construction that allows for numerous panel configurations using a relatively smaller number of distinct components or modules. Power control modules control groups of circuit breakers and a current monitoring module measures total current to the panel. Other circuit breakers may be uncontrolled. A serial digital interface communication cable connects the modules to a controller. The control of power to at least some of the loads allows for a lower power panel to be installed than would otherwise be needed.

20 Claims, 9 Drawing Sheets

SECTION A-A

MODULAR ELECTRICAL PANEL FOR CONTROLLING POWER USAGE

TECHNICAL FIELD

This application relates to the field of smart electrical panels and more specifically to their internal wiring and construction.

BACKGROUND

Green energy systems attempt to mitigate environmental impacts and conserve natural resources by utilizing renewable energy sources and controlling demand to match the immediate supply. As electricity consumption increases as electric vehicles become more popular, electricity panels in homes and offices are increasing in their power capabilities. As well as using more resources to build the higher power panels with correspondingly more or larger components, the increasing peak consumption creates demand for more power generation infrastructure. Such commissioning in turn creates a carbon footprint, whether the new power source is green or traditional.

Patents U.S. Pat. Nos. 11,309,711 and 11,342,754 both to Rao et al. disclose a smart electrical panel that looks, from the front, like a standard panel in that the breakers are stacked vertically and an electrician connects directly to them from the sides, after possibly feeding the connecting wire through a current transformer. Behind the breakers, there is a second layer of electronics. This contains a vertical bus bar, which may connect to the mains through a switch, breaker, or relay. There is a set of relays, which directly connect to the bus bar with one terminal and connect forward, to the bottom of a breaker, with the other terminal to form a branch circuit. Somewhere on the branch circuit there is a current sensor, either a shunt in the branch circuit or relay or a current transformer before or after the breaker or relay. A plurality of branch circuits are included. Processing, relay control, and converters may be included.

Patent U.S. Pat. No. 11,552,500 also to Rao et al. discloses an extension of the above, in which the relay connects to the bus bar with a tab, which is also a resistive shunt.

Patent U.S. Pat. No. 11,770,006 also to Rao et al. discloses a physical arrangement that has the bus bars and the relays in the back and one terminal of each relay protruding through a hole in a deadfront panel and then into its circuit breaker.

In the panels in the above patents the energized bus bars run down the rear compartment and connect to relays to form branch circuits. The relays then connect to circuit breakers at the front of the panel. Current transformers are used on the branch circuits, either past the breakers, with the electrician feeding the wire through the transformer, or perhaps between the relay and the breakers or perhaps between the relay and the bus bars. The panels may also measure current using shunt resistors on the branch circuits, perhaps internal to the relays.

Patent application US2022/0216728 to Ashman et al. describes load shedding to prevent overload using load preferences and limits. There is a first mode in which electrical power is limited by protection devices and a second mode in which one or more loads are shed based on both load preferences and limits.

Patent application US2023/0120453 to Rao et al. describes monitoring currents, detecting faults, and managing them by communicating a control signal to the device load.

Patent application US2023/0120740 to Lewchuk et al. describes, when charging an electric vehicle, monitoring the load on its electrical panel and, possibly using preference information, setting the charge rate for the vehicle.

This background is not intended, nor should be construed, to constitute prior art against the present invention.

SUMMARY OF INVENTION

This invention relates to the modular construction of smart electrical panels. The modules include, for example, modular insulating panels of a small number of different types, a current monitoring module and one or more power control modules. Each power control module comprises electromechanical relays, or solid-state relays that each control power to one of a plurality of circuit breakers. Other circuit breakers may be included that are not controlled, and are connected directly to the live bus bars. This allows for the manufacture of numerous differently configured electrical panels using insulating panels of only a few different types and power control modules of potentially only one type. To permit such modular construction and the functioning of such electrical panels, one or more communication cables connect the power control modules and the current monitoring module to a controller.

This invention also pertains to controlling power demand and more particularly, it provides a flexible and economical system to monitor and control power delivery to its dominant loads. The system is, for example, embodied in an electrical panel for a home or business. Relays are connected in series with some of the circuit breakers in the panel. The controller for the panel switches the relays on and off depending on whether power is to be provided to the loads that are connected to the panel via the circuit breakers. By being able to control which of the loads are connected at any one time, the total amount of power drawn by the panel is limited. By scheduling large loads to be connected sequentially to the panel rather than simultaneously, panels with smaller power capabilities may be installed and used in preference to higher power panels that are typically larger and more expensive.

Energized or hot bus bars run down multiple insulating panels in the single compartment of the electrical panel. Power control modules have secondary conductors that connect to the bus bars and run along a printed circuit board inside the module. These secondary conductors have their current estimated at one or more places along their length, either with a current transformer surrounding the secondary conductor or with one or more Hall-effect sensors on the printed circuit board near the secondary conductors. The power control modules each have circuit conductors coming from the secondary conductor, passing through relays or solid-state devices to interrupt the current, and exiting the module. The circuit conductors exiting the module are then connected to circuit breakers at approximately the same depth in the compartment as the power control modules. Furthermore, the power control modules are connected together and to a main current monitoring module with a serial communications line or lines.

Disclosed is an electrical panel comprising: a first insulating panel; a second insulating panel different from the first insulating panel; an energized bus bar, affixed to the first and second insulating panels; a current monitoring module comprising a sensor to measure a current in the energized bus bar, the current monitoring module removably connected to the energized bus bar in front of the first insulating panel; a plurality of circuit breakers affixed to and in front of the second insulating panel; a power control module comprising a secondary conductor, a plurality of relays each connected to the secondary conductor, and for each relay, a circuit conductor, wherein the power control module is removably connected via the secondary conductor to the energized bus bar in front of the second insulating panel, and via each of the circuit conductors to a different one of the circuit breakers; and one or more disconnectable communication lines connecting the current monitoring module, the power control module and a controller that causes the relays to switch on and off.

Further disclosed is an electrical panel comprising: two energized bus bars; a current monitoring module comprising a sensor to measure current in the energized bus bars, a first microprocessor with an SDI (serial digital interface), and a first SDI connector; a plurality of circuit breakers; one or more power control modules, each comprising a plurality of secondary conductors each electrically connected to one of the energized bus bars, a plurality of circuit conductors each electrically and removably connected to one of at least some of the circuit breakers, a plurality of printed circuit boards, a plurality of electromechanical or solid-state relays each mounted on one of the printed circuit boards and electrically connected to one of the secondary conductors and one of the circuit conductors, a second microprocessor with a second SDI, and a second SDI connector; a controller comprising a third microprocessor with a third SDI, the third microprocessor configured to cause the second microprocessor to command the electromechanical or solid-state relays to switch on and off depending on the current in the energized bus bars, which is communicated by the first microprocessor; one or more SDI cables connecting the current monitoring module, the one or more power control modules and the controller; and a plurality of insulating panels, wherein each insulating panel comprises a plurality of first connectors that affix the energized bus bars to a front side thereof, one of the insulating panels is configured to allow removable connection of the current monitoring module to portions of the energized bus bars that are affixed to said one of the insulating panels, and for each of the power control modules, another of the insulating panels (a) is configured differently from said one of the insulating panels, (b) is configured to allow removable connection of the power control module to other portions of the energized bus bars that are affixed to said other of the insulating panels, and (c) comprises a plurality of second connectors that affix the power control module's corresponding circuit breakers thereto.

This summary provides a simplified, non-exhaustive introduction to some aspects of the invention, without delineating the scope of the invention.

BRIEF DESCRIPTION OF THE DRAWINGS

The following drawings illustrate embodiments of the invention and should not be construed as restricting the scope of the invention in any way.

DESCRIPTION

A. Glossary

AC—Alternating current

DC—Direct current

The term "firmware" includes, but is not limited to, program code and data used to control and manage the interactions between the various modules of the system.

The term "hardware" includes, but is not limited to, the physical housing and structure of an electrical panel, sensors, electrical components, connectors, wiring, circuit boards, modules and insulation.

The term "module" can refer to any component in this invention and to any or all of the features of the invention without limitation. A module may be a software, firmware or hardware module or any combination thereof, and may be located in the electrical panel, a user device or a remote server. For example, a module is an electrical subcomponent with its own complete or partial enclosure, mounted inside an electrical panel.

The term "network" can include both a mobile network and data network without limiting the term's meaning, and includes the use of wireless (e.g. 2G, 3G, 4G, 5G, WiFi™, WiMAX™, Wireless USB (Universal Serial Bus), Zigbee™, Bluetooth™ and satellite), and/or hard wired connections such as local, internet, ADSL (Asymmetrical Digital Subscriber Line), DSL (Digital Subscriber Line), cable modem, T1, T3, fibre, dial-up modem, television cable, and may include connections to flash memory data cards and/or USB memory sticks where appropriate.

The term "processor" or "processing circuitry" or "microprocessor" is used to refer to any electronic circuit or group of circuits that perform calculations, and may include, for example, single or multicore processors, multiple processors, an ASIC (Application Specific Integrated Circuit), and dedicated circuits implemented, for example, on a reconfigurable device such as an FPGA (Field Programmable Gate Array). The processor performs one or more of the steps in the flowchart, whether they are explicitly described as being executed by the processor or whether the execution thereby is implicit due to the steps being described as performed by code or a module. The processor, if comprised of multiple processors, may be located together or geographically separate from each other. The term includes virtual processors and machine instances as in cloud computing or local virtualization, which are ultimately grounded in physical processors. A processor may incorporate computer-readable memory and/or have access to it.

The term "software" includes, but is not limited to, program code that performs the computations necessary for determining loads, determining changes in loads, determining the state of a power supply grid, receiving information from the grid, interpreting information from the grid and user inputs, sending signals to control the relays in the panel, and outputting data to the user.

The term "system" when used herein refers to a system for controlling power provided to individual load circuits that are connected via circuit breakers and relays to an electrical panel, the system being the subject of the present invention. The system includes an electrical panel, its modular construction and the modules necessary for its functioning, some or all of the modules being located within the electrical panel and optionally some of them being located outside or remotely from the panel.

The term "user" refers to a person who uses the system or interacts with it via a user device, such as a smartphone or other user communications device. There may be different types of user, such as an occupant or owner of a building in which the panel is installed, or an installer or servicer of the panel.

B. Exemplary Embodiments

Figure 9:
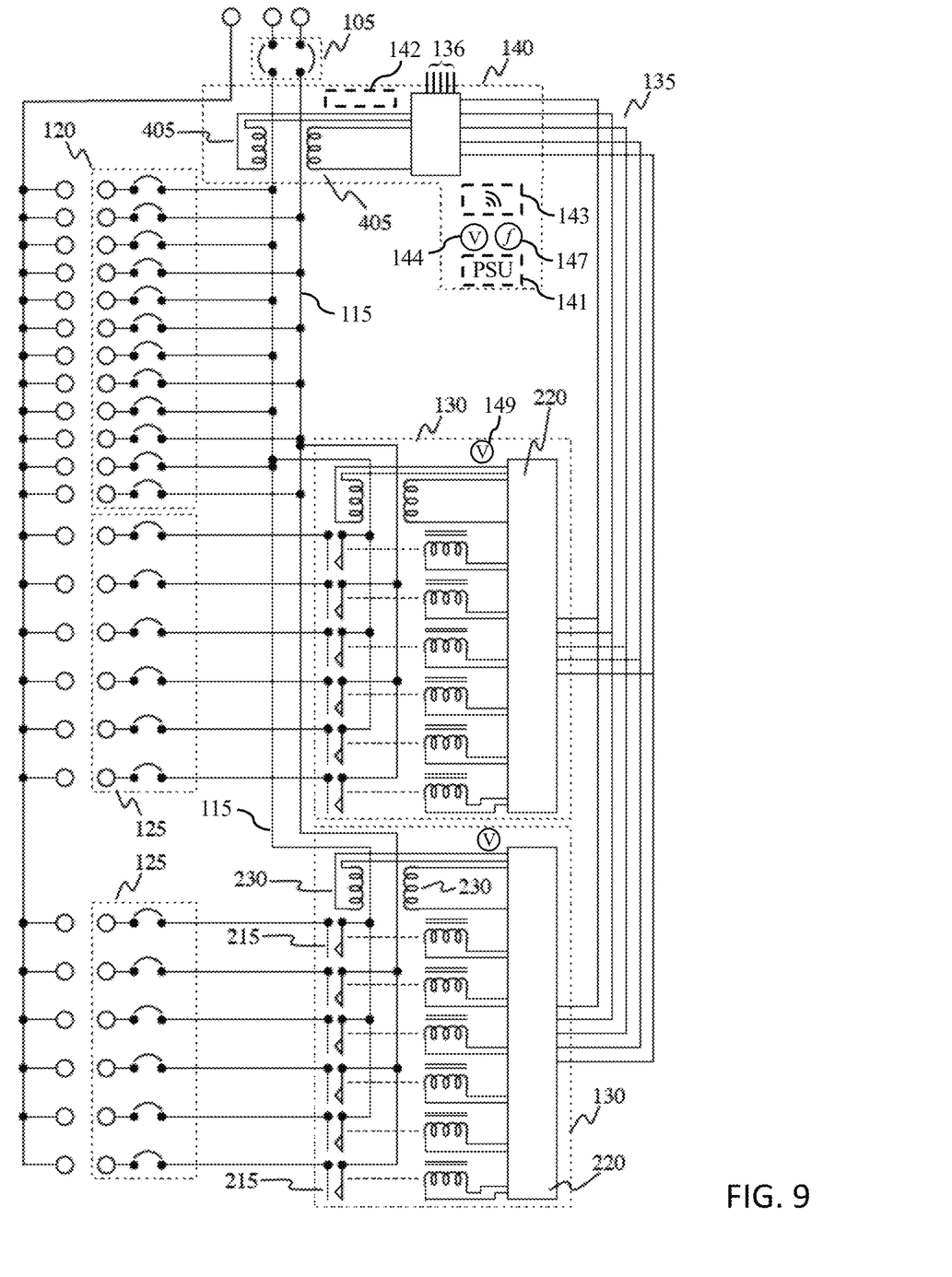
FIG. 9 is a circuit diagram of an electrical panel, according to an embodiment of the present invention.

First referring briefly to FIG. 9, the circuit diagram of an exemplary electrical panel shows that some of the circuit breakers 120 are connected as a group directly to the energized bus bars 115 whereas other circuit breakers 125 are connected as two groups to the energized bus bars via relays 215 in two power control modules 130.

Figure 1:
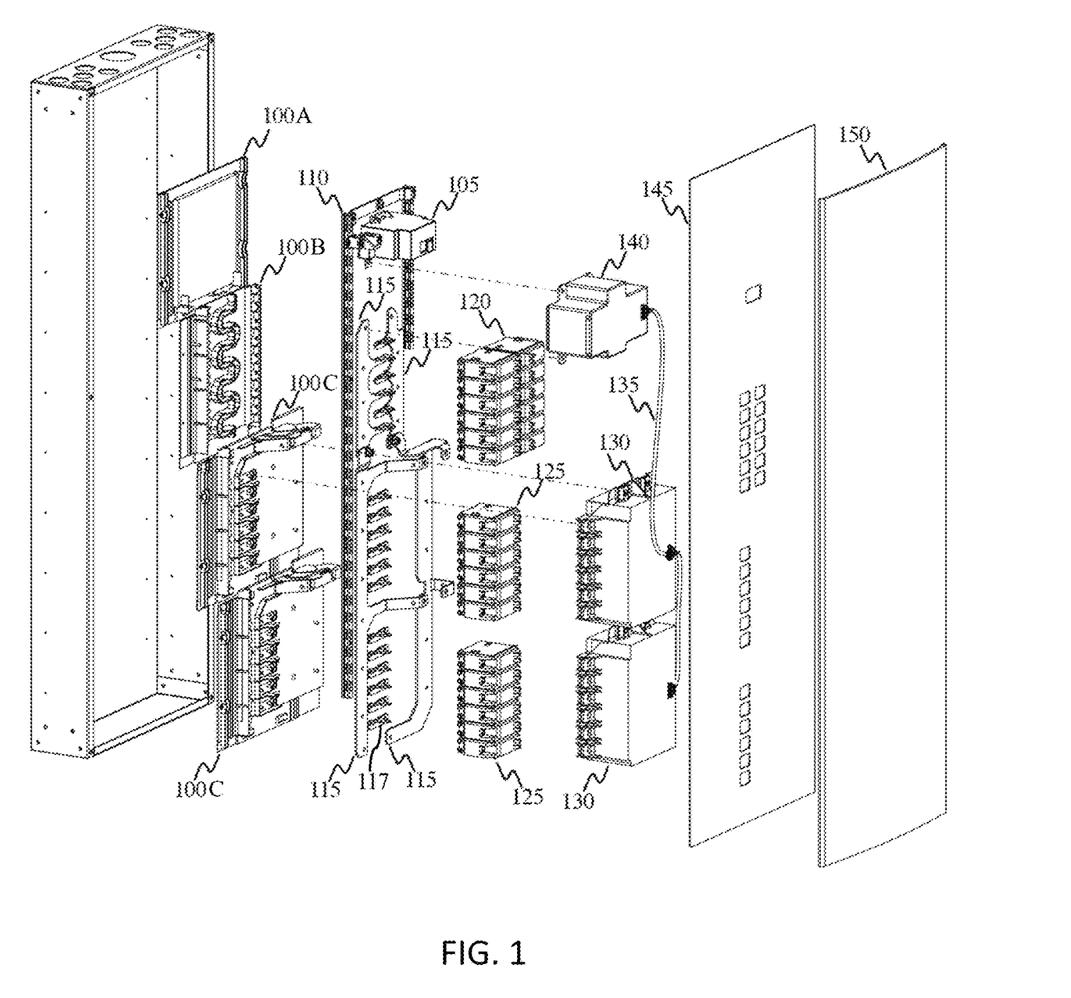
FIG. 1 is an exploded drawing of an electrical panel, according to an embodiment of the present invention.

FIG. 1 shows an exemplary embodiment of a power control system, embodied in the form of an electrical panel. A plurality of insulating panels 100A-C have connectors or mounts for affixing neutral bus bars 110, energized bus bars 115 and circuit breakers 120, 125 thereto. The neutral and energized bus bars are AC bus bars. The insulating panels 100A-C typically have round plastic posts pointing towards the front. The neutral and energized bus bars have holes that fit over the posts. After the bus bars are in place, the tops of the posts are melted, either with heat or ultrasonic energy, permanently securing the bus bars in place.

Figure 2:
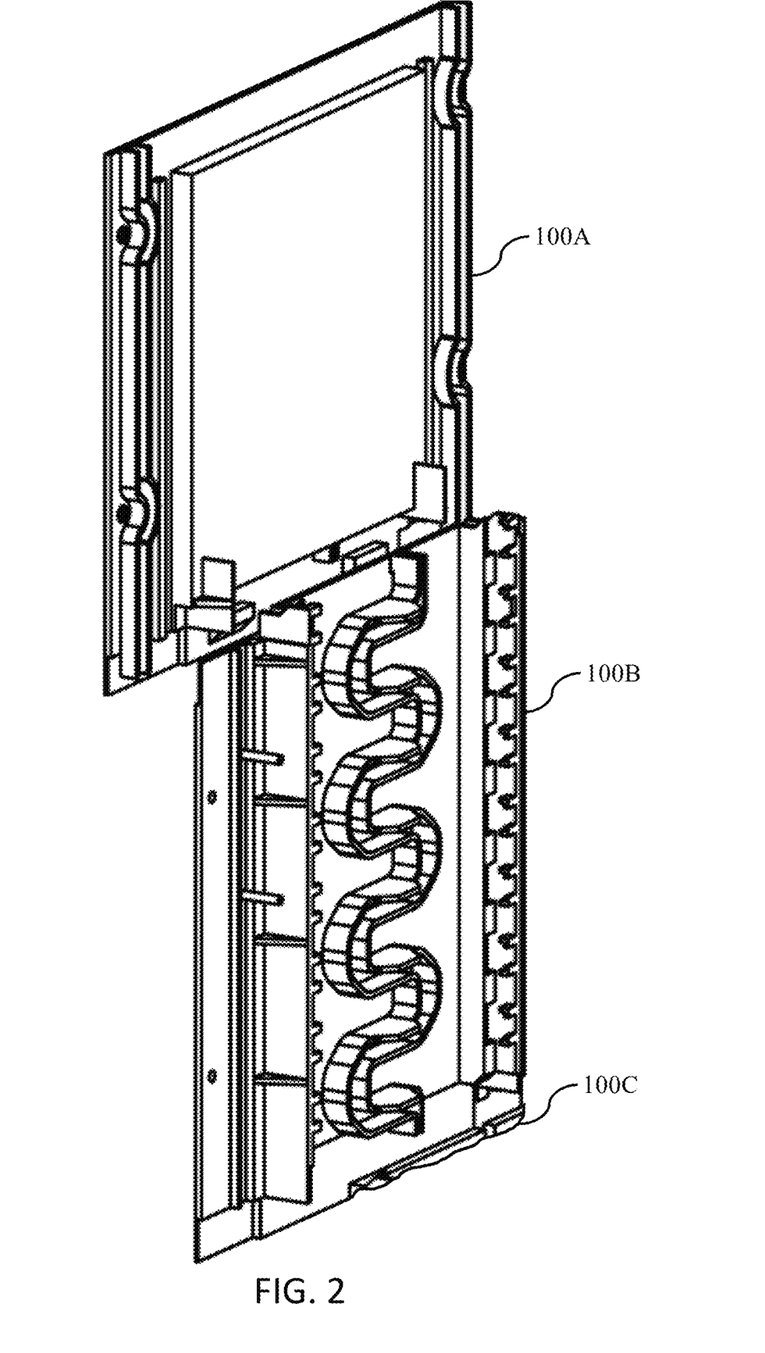
FIG. 2 is a closer view of the upper two insulating panels, according to an embodiment of the present invention.
Figure 3:
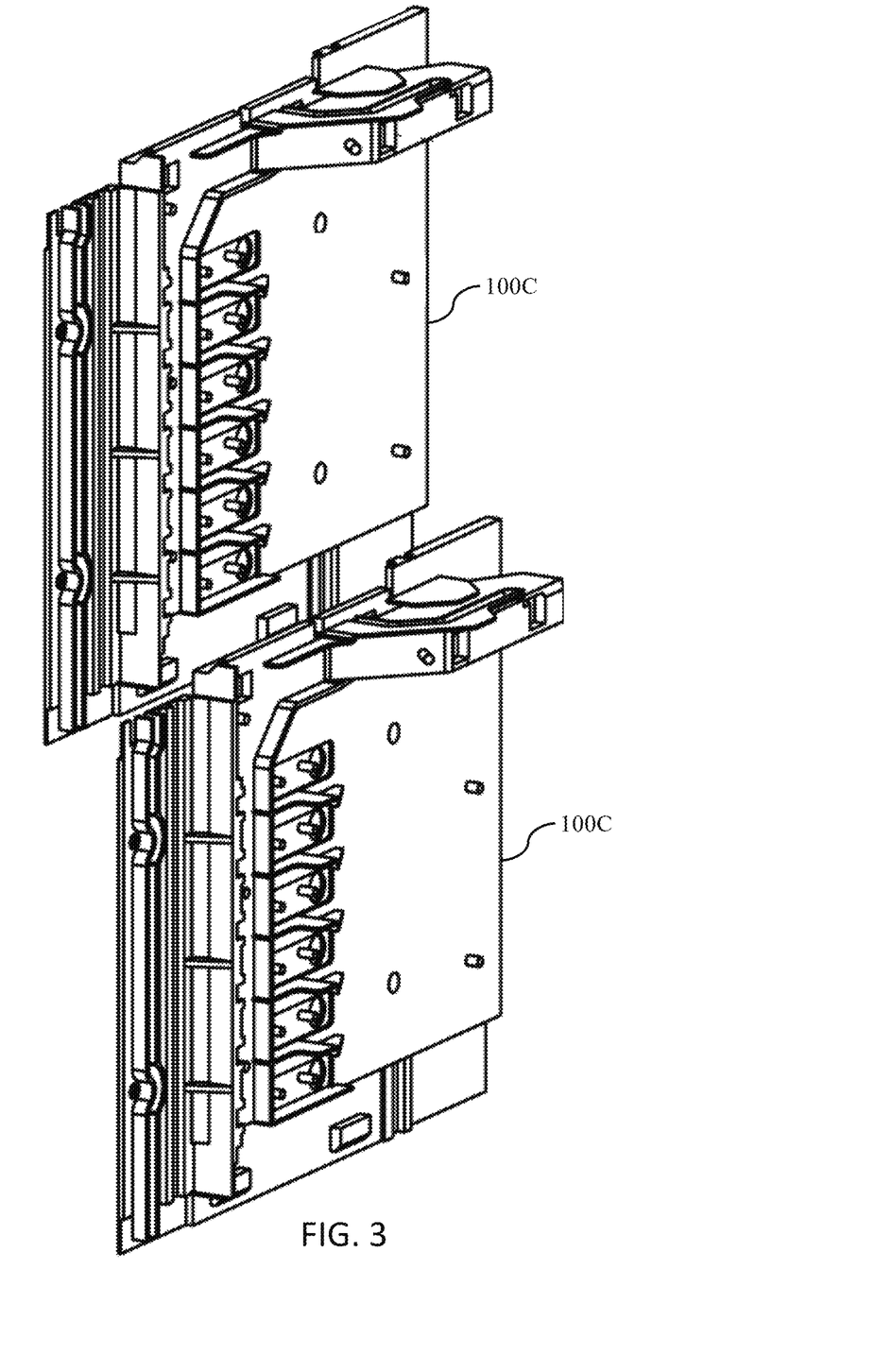
FIG. 3 is a closer view of the lower two insulating panels, according to an embodiment of the present invention.

In this embodiment, there are three different kinds of insulating panel 100A-C. Enlarged views of the insulating panels 100A-C are shown in FIGS. 2-3. Referring back to FIG. 1, insulating panel 100A is located behind the upper region of the neutral bus bars 110, and is generally aligned with the current monitoring module 140. The neutral bus bars 110 are affixed to the insulating panel 100A. The insulating panel 100A is specific to the mounting of the current monitoring module 140, or the mounting of portions of the energized bus bars 115 to which the current monitoring module 140 is connected. The current monitoring module 140 is mounted to the energized bus bars 115 passing in front of the insulating panel 100A. The insulating panel 100A provides insulation to the rear of the energized bus bars 115 passing in front of it.

Insulating panel 100B is located at the upper middle region of the electrical panel, behind the neutral and energized bus bars, and is generally aligned with the circuit breakers 120. The insulating panel 100B is specific to the mounting of the circuit breakers 120, the portions of the energized bus bars 115 to which the circuit breakers are connected and the portion(s) of the neutral bus bars 110 passing in front of the insulating panel 100B. These portions of the neutral bus bars 110 are affixed to the insulating panel 100A. The circuit breakers 120 are held under a rail on the insulating panel 100B and are electrically connected to the energized bus bars 115 passing in front of the insulating panel 100B. The insulating panel 100B provides insulation to the rear of the energized bus bars 115 passing in front of it and their connections to the circuit breakers 120. The insulating panel 100B may have electrical connectors mounted on it, each electrical connector connecting to one of the circuit breakers and one of the energized bus bars. Alternatively, the energized bus bars may have protruding contacts that connect to circuit breakers.

There are two insulating panels 100C, located at the lower region of the electrical panel, behind the neutral and energized bus bars, and each insulating panel 100C is generally aligned with one group of circuit breakers 125 and one power control module 130. A group of circuit breakers 125 and a power control module 130 are positioned side by side in front of an insulating panel 100C. The insulating panel 100C is specific to the mounting of the circuit breakers 125, the portions of the energized bus bars 115 passing in front of the insulating panel 100C and the associated portion(s) of the neutral bus bars also passing in front of it. These portions of the neutral bus bars 110 are affixed to the insulating panel 100C, as are the corresponding portions of the energized bus bars 115. The circuit breakers 125 are held under a rail on the insulating panel 100C and are electrically connected to the power control module 130 in front of the insulating panel 100C. The insulating panel 100C provides insulation to the rear of the energized bus bars 115 passing in front of it and to the circuit breakers 125 and terminals of the power control module 130.

The insulating panels 100A-C each have a different group of structures extending from the front surface of an essentially flat base. Plastic blades extends towards the front of the electrical panel and wrap around the bus bars and circuit breaker conductors to separate them. This is so that, if the panels get wet, they are still safe to operate because the creepage path along the plastic is sufficiently long between the two bus bars and adjacent conductors. Each insulating panel 100A-C conforms to the particular bus bar and circuit conductor arrangement that it hosts. Typically, the insulating panels are injection moulded, although other, more expensive forms of producing plastic parts are possible, e.g. machining them out of larger blocks.

While the insulating panels do not have to be the same length, it is possible that two or more different types of insulating panel have the same length. For example, insulating panels 100B and 100C may have the same length. An advantage of having them the same length means that the holes in the metal back panel of the box allow one insulating panel to be substituted for another with no changes to the back panel.

From only three different insulating panel types, a greater number of differently configured electrical panels can be constructed. For example, in a given electrical panel there may be one insulting panel 100A for mounting a current monitoring module 140, zero or more insulating panels 100B for uncontrolled breakers, and zero or more insulating panels 100C for controlled breakers. For example, a small electrical panel may have one insulating panel 100A for a current monitoring module and one insulating panel 100C for controlled breakers. As another example, a larger electrical panel may have one insulating panel 100A for a current monitoring module, two insulating panels 100B for uncontrolled breakers and two insulating panels 100C for controlled breakers. An electrical panel for an electric vehicle parking and charging lot may have one insulating panel 100A for a current monitoring module and six insulating panels 100C for controlled breakers, so that all circuits are fully controllable.

The modularity of the insulating panels reduces the amount of tooling required and waste generated during manufacture of different electrical panels. Also, each insulating panel 100B, 100C may be mounted with the maximum or fewer than the maximum of circuit breakers that it is configured to accept. This makes it more convenient to efficiently satisfy the electrical needs of different types of residential, business and commercial buildings. The modularity also makes for more convenient repairs or upgrades to the modules.

Figure 4:
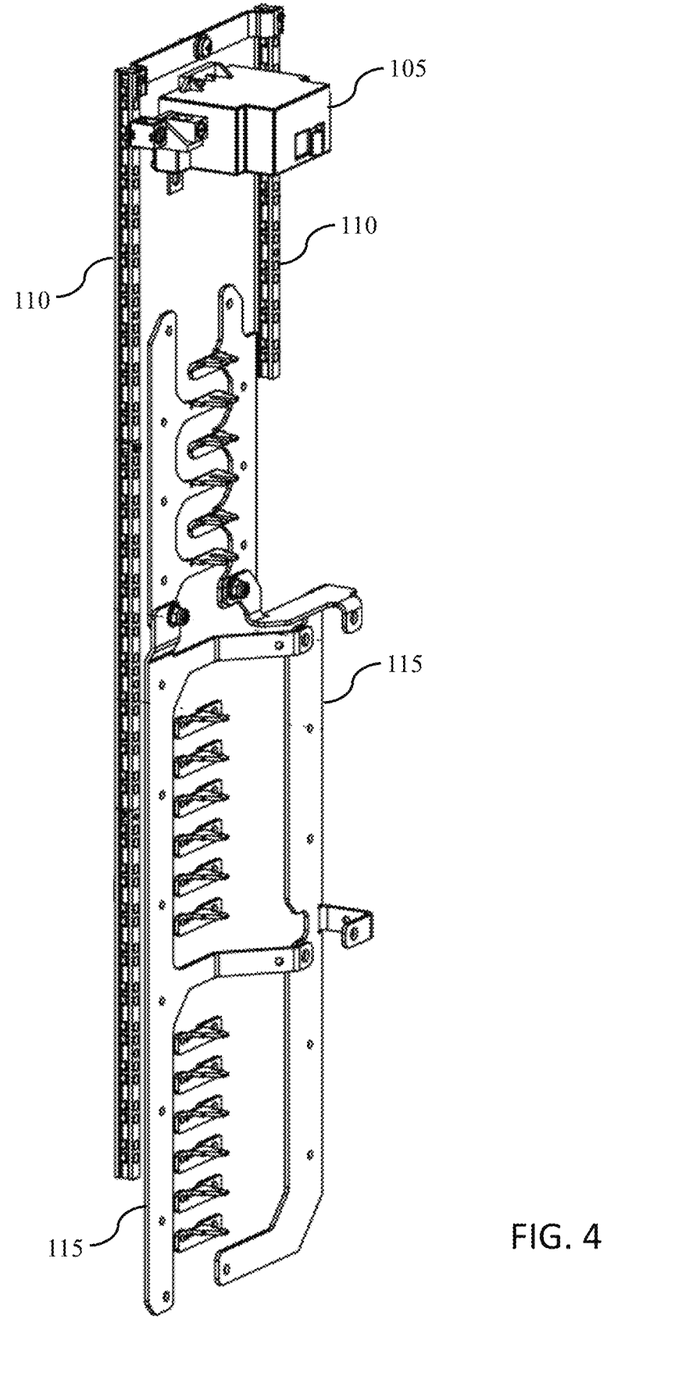
FIG. 4 is a closer view of the bus bars, according to an embodiment of the present invention.

The neutral bus bars 110 and energized bus bars 115 are shown closer up in FIG. 4. There are two connected neutral bus bars 110, one on the left extending most of the length of the electrical panel and a shorter one on the right. There are two separate energized bus bars 115, both extending most of the length of the electrical panel. The energized bus bars 115 do not run the entire length of the panel, and are completed via the bus bar current monitoring module 140, which completes the connections of the energized bus bars to the grid circuit breakers 105. Each neutral and energized bus bar may be made from multiple, electrically connected conductors of different shapes and dimensions depending on which combination of insulating panels 100A-C are selected, which is determined based on the desired number and location of the modules 130, 140.

Referring back to FIG. 1, this embodiment includes a group of twelve independent circuit breakers 120 that directly connect to the energized bus bars 115 in front of the insulating panel 100B. This embodiment also includes two groups of six circuit breakers 125, each set in front of a different one of the insulating panels 100C. Circuit breakers may be mechanically affixed to the insulating panels 100B, 100C either directly or indirectly. Each set of circuit breakers 125 connects to one of two power control modules 130 that, in turn, directly connect to the energized bus bars 115.

The power passing through the circuit breakers 120 may be considered to be uncontrolled power and these may be considered to be uncontrolled breakers. Loads that are considered more important, essential or of typically lower power may be connected to circuit breakers 120. For example these could be lighting, security systems, routers or freezers. The power control modules 130 are mounted to the sides of the groups of circuit breakers 125, resulting in the physical depth of the electrical panel being shallower than if the circuit breakers were mounted in front of the power control modules.

The power passing through the power control modules 130 and circuit breakers 125 may be considered to be controlled power, and these breakers may be considered to be controlled breakers. Loads that could be switched off for a while without inconvenience may be connected to these breakers. For example, hot water heaters, clothes dryers, electric vehicle chargers and outside lighting.

It will be clear to those skilled in the art that various combinations and/or shapes of the insulating panels 100A-C are possible to vary the total number of insulating panels, and the numbers of circuit breakers with controlled and uncontrolled power. It will also be clear that, to meet the needs of the connected loads, some of the circuit breakers may be of the single-pole type, which is directly or indirectly fed by a single bus bar, and some of the circuit breakers may be of the double-pole type, which is directly or indirectly fed by both bus bars.

This embodiment also includes an AC grid circuit breaker 105 (also in FIG. 4), which powers the bus bars 115, and the set of neutral bus bars 110 completes the electrical circuits. This embodiment includes a bus bar current monitoring module 140 connected to the power control modules 130 with a serial digital communications cable 135, which also distributes low-voltage DC power between the power control modules. The DC power may be derived from a power supply within the current monitoring module 140, a transformer connected to the energized bus bars and/or a rechargeable battery, for example. A safety panel 145 covers the electrical components of the entire system, exposing only the circuit breaker operating mechanisms. This embodiment also comprises a cosmetic cover 150. It is possible in some embodiments for conductors on a disconnectable circuit board to be used instead of the cable, provided that adequate separation from the AC voltage is maintained.

Figure 5:
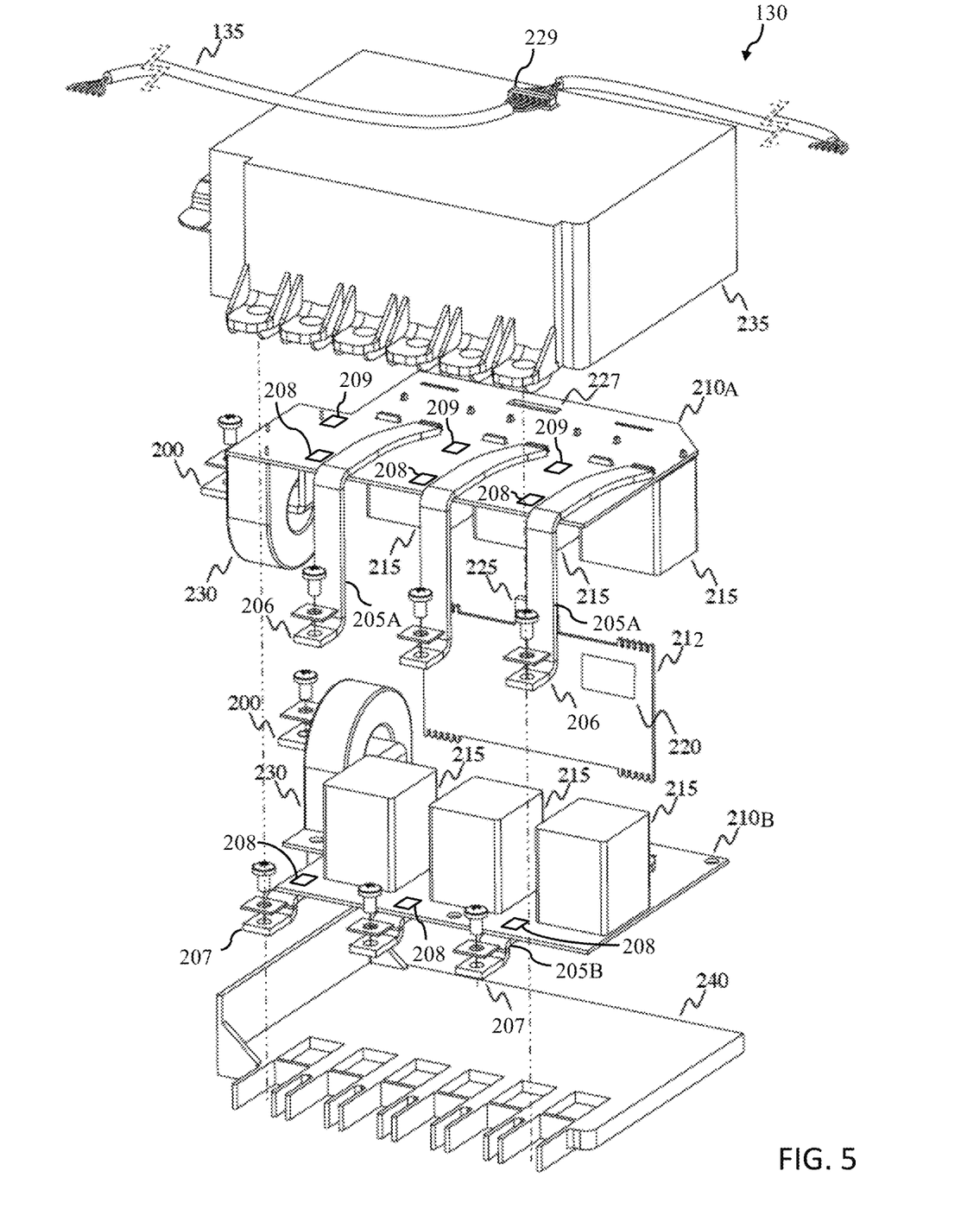
FIG. 5 is an exploded drawing of a power control module, according to an embodiment of the present invention.

FIG. 5 shows an exemplary embodiment of a power control module 130. There are two secondary conductors 200, which attach to the bus bars 115 shown in FIG. 1, using screws, for example. All or a majority of each secondary conductor 200 is inside the power control module 130. Each secondary conductor 200 passes through a current transformer 230 and connects via a corresponding circuit board 210A, 210B to its respective group of three relays 215. Each relay group is oriented with the relay terminals facing in opposite directions so as to form a compact package when assembled. The terminals on the upper group of three relays are facing upwards (i.e. in one direction), these three relays being mounted on the lower side of circuit board 210A. The terminals on the lower group of three relays are facing downwards (i.e. opposite to said one direction), these three relays being mounted on the upper side of circuit board 210B.

To continue the circuit through each relay, the other terminal of each relay connects to a circuit conductor 205A, 205B, each of which directly or indirectly electrically connects to a circuit breaker 125 shown in FIG. 1. The circuit conductors 205A that connect to the relays 215 on circuit board 210A extend across the opposite surface of the circuit board 210A and bend over beyond the edge of the circuit board 210A, continuing to extend down spanning the height of the relays to terminals 206, which align in a row with the terminals 207 on the circuit conductors 205B that are connected to the other relays on the other circuit board 210B. The terminals 206, 207 of the circuit conductors 205A, 205B electrically connect with screws, for example, to the circuit breakers 125, either directly or via an intervening conductor.

Each power control module 130 also includes a microprocessor 220 with a serial digital interface and a serial digital interface connector 225 mounted on perpendicular circuit board 212 and accessible through slot 227 on circuit board 210A. Insulating top cover 235 and bottom cover 240 enclose the power control module. Another connector 229 connects the serial digital communications cable 135 to the serial digital interface connector 225 mounted on perpendicular circuit board 212.

The microprocessor 220 receives commands from the serial digital interface that indicate which relays to activate. In this embodiment, the power control module 130 includes means, including electronic circuitry for example, to measure the current through the secondary conductors 200 via the current transformers 230, and electronic circuitry to measure the voltage (e.g. voltmeter 149) of the circuit conductors. The measurement of the voltage in the circuit conductors is optional, and if included it is only to confirm that the relays are operating normally, and not to control the load. An alternative embodiment uses one or more Hall-effect sensors 209 to estimate the current at one or more places along each secondary conductor 200 by placing Hall-effect sensors on the printed circuit board near each secondary conductor. Yet another alternative embodiment uses several Hall-effect sensors 208 to estimate the current of each circuit conductor 205A, 205B. These measurements may be reported over the serial digital interface and used to make some of the load-shedding decisions. In some embodiments it is not necessary to measure the current in each circuit conductor separately because the corresponding relays are switched on and off in order of priority specified by a user and not based on the individual circuit currents. The control of the loads supplied via the electrical panel can therefore be achieved without sensors for measuring the individual circuit currents.

Figure 6:
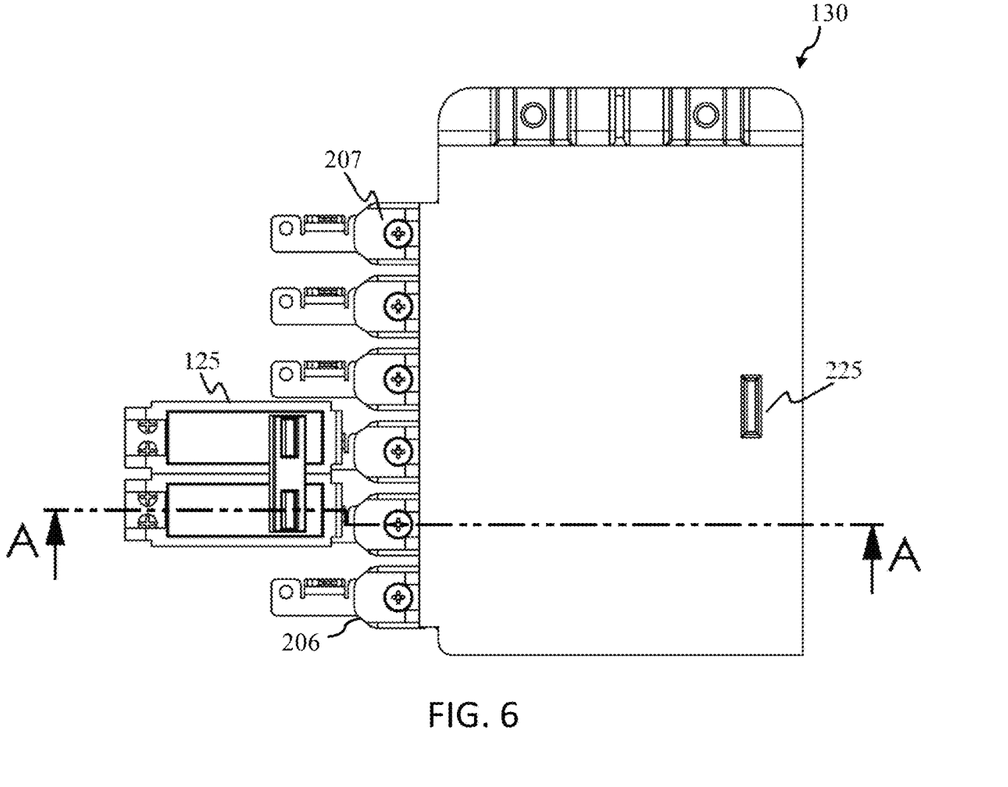
FIG. 6 is a top view of a power control module and breakers, according to an embodiment of the present invention.
Figure 7:
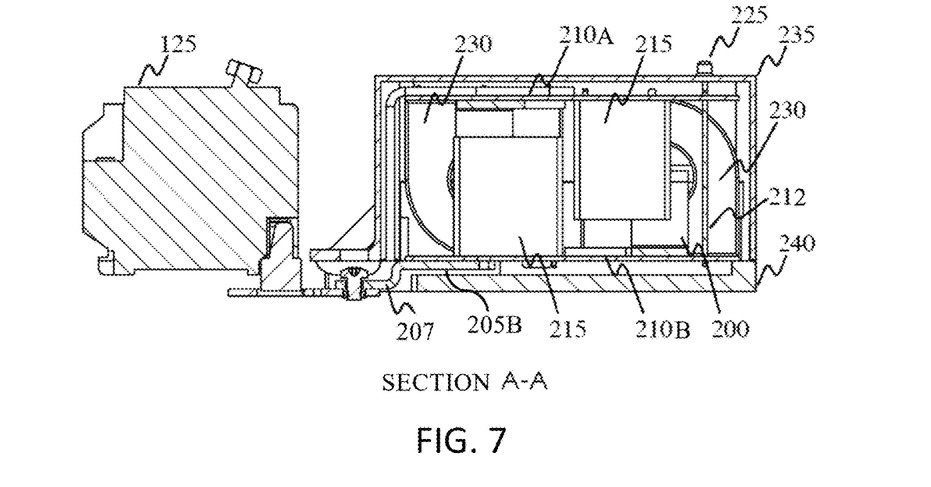
FIG. 7 is a sectional view of a power control module and breakers, according to an embodiment of the present invention.

FIG. 6 shows a top view of a power control module 130 showing the serial digital interface connector 225, the six terminals (206, 207) of the circuit conductors (three each of 205A, 205B) and two of the circuit breakers 125. FIG. 7 is a cross-section taken along line A-A of the power control module 130 shown in FIG. 6, assembled in its compact form, and an electrically connected circuit breaker 125. Given the limited space typically inside a panel, it is important to make any additional components as compact as possible. Notably, the circuit breakers 125 are located to the side of power control module 130. Also shown in the sectional view is a secondary conductor 200, a circuit conductor 205B, upper circuit board 210A, lower circuit board 210B, perpendicular circuit board 212, relays 215 oriented in opposite directions, serial digital interface connector 225, current transformers 230, top cover 235 and bottom cover 240. In other embodiments, two or more of the circuit boards are replaced with a single circuit board.

This embodiment includes a serial digital interface that utilizes the Controller Area Network bus standard but it will be clear to those skilled in the art that in other embodiments, other serial digital interfaces and protocols are possible, such as TIA/RS-485, TIA-899, Modbus™, 1-Wire™, SPI (Serial Peripheral Interface), I2C, Universal Serial Bus, ControlNet™, single-wire Ethernet, or a current loop.

Figure 8:
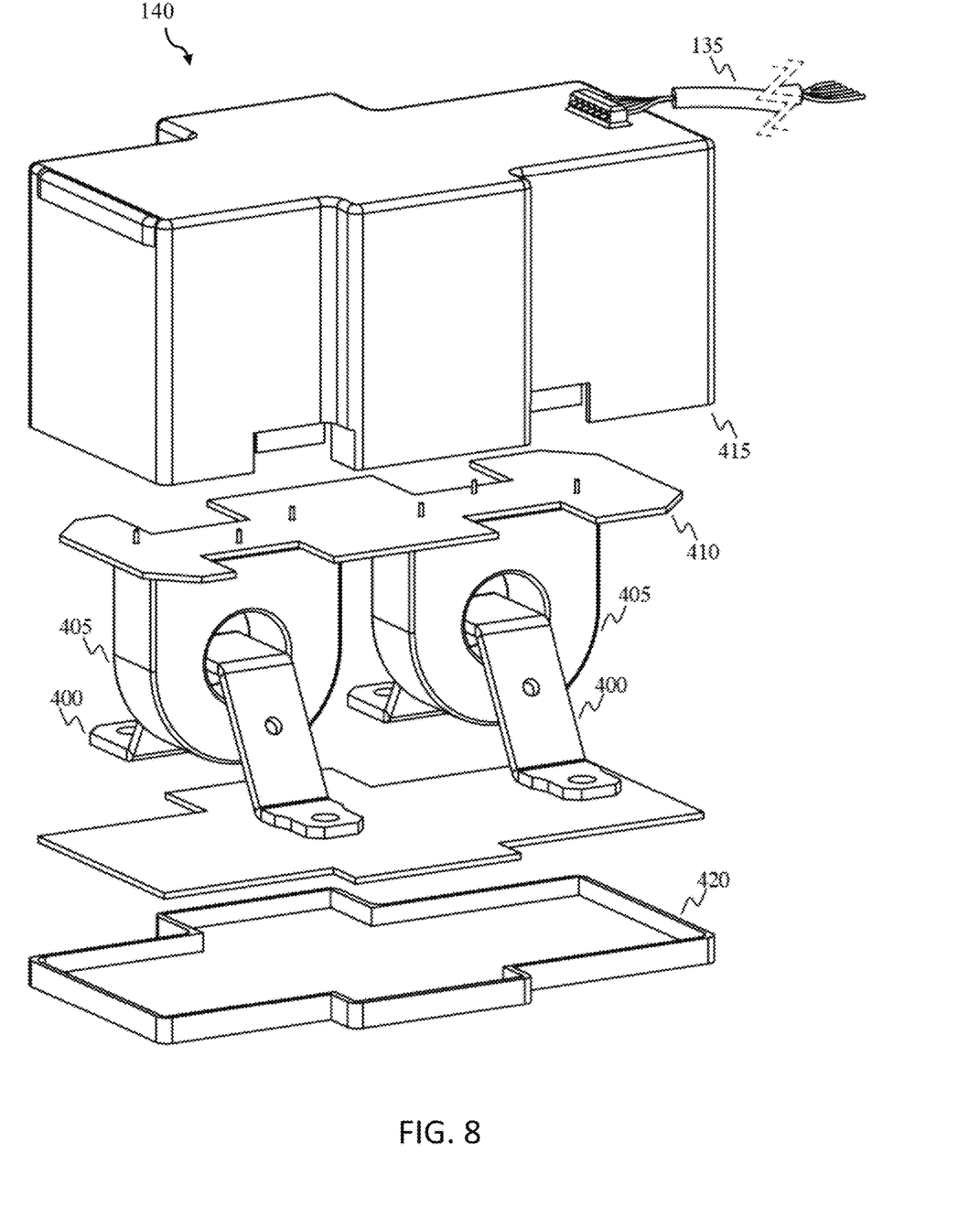
FIG. 8 is an exploded drawing of a bus bar current monitoring module, according to an embodiment of the present invention.

FIG. 8 shows an exemplary embodiment of the current monitoring module 140. Two energized bus bars 400 or bridges, which electrically connect to and can be considered to be portions of bus bars 115, pass through current transformers 405 mounted to a printed circuit board assembly 410. The bus bars 115 may be considered to be completed by the bus bars 400. Insulating top cover 415 and bottom cover 420 enclose the module. The bus bar current monitoring module includes one or more sensors, electronic circuitry and/or program code to measure the current through the bus bars 400 via the current transformers 405 and to measure the voltage and frequency of the bus bars, and to report these measurements over the serial digital interface and serial digital communications cable 135.

FIG. 9 shows a schematic block circuit diagram of the embodiment of a power control system shown in FIG. 1. Power from the grid is fed to the electrical panel via AC grid circuit breakers 105, which supply energized bus bars 115. The bus bar current monitoring module 140 has current transformers 405 that monitor the total energized bus bar currents. A group of circuit breakers 120 is connected directly to the energized bus bars 115. Loads that are connected to these circuit breakers 120 are not individually controlled by the electrical panel, but may be switched off together when the AC grid circuit breakers 105 trip. Two other groups of circuit breakers 125 are connected indirectly to the bus bars 115, via relays 215 within the power control modules 130. Current transformers 230 measure the total current flowing to each set of the indirectly connected circuit breakers 125. Processors 220 within the power control modules 130 control the switching on and off of the relays 215, as a result of commands received on the serial digital communications cable 135, which are generated by the current monitoring module 140. The serial digital communications cable 135 connects the bus bar current monitoring module 140 to the power control modules 130.

In one embodiment, the bus bar current monitoring module 140 further includes a low-voltage DC power supply 141 and a central controller 142 which makes the load control decisions, the central controller including a microprocessor, a serial digital interface, and a wireless communication interface. It would be clear to those skilled in the art that the central controller 142 may be elsewhere in other embodiments as long as it connects to the serial digital communications cable 135. For example, the central controller may be in the power control module or anywhere else in the electrical panel. In an alternative embodiment, the central controller 142 is in its own insulating enclosure within the electrical panel and not connected to any AC circuit. In other embodiments, the central controller 142 is outside the electrical panel.

In one embodiment, the wireless communication interface 143 of the central controller 142 utilizes the TCP/IP protocol over Wi-Fi™ to communicate outside the system. In this embodiment, the central controller 142 uses the wireless interface to obtain information about the condition of the AC electrical grid directly or indirectly from the grid power provider.

In one embodiment, the central controller 142 also uses the wireless interface to allow the user to identify and configure the relative importance of the various controllable loads. Alternately, the user may input a list of priorities in which each load is to be turned off when the situation demands it, each load corresponding to a particular relay that is to be switched off. In some embodiments, the user may specify times of day in which electricity is more expensive.

In one embodiment, the central controller 142 obtains information about the loads by communicating with the bus bar current monitoring module 140 over the serial digital interface cable 135 to obtain the total current of each energized bus bar 115. In other embodiments, the serial digital interface cable 135 is extended as cable 136 to communicatively connect with one or more smart loads that indicate to the electrical panel the amount of power they require, when they require it and for how long. This information is then used by the controller to manage the supply of the power to the various smart loads and other loads, by controlling the relays via which they are connected. In one embodiment, the central controller 142 also obtains information about the condition of the AC electrical grid by communicating with the bus bar current monitoring module 140 over the serial digital interface cable 135 to obtain the voltage and frequency of the grid.

In some embodiments, the central controller 142 include a voltage sensor 144, which measures the voltage across the energized bus bars 115. In some embodiments, the central controller 142 include a frequency sensor 147, which measures the frequency of the voltage on the energized bus bars 115.

In one embodiment, the central controller 142 detects situations in which it should reduce the load: either the total bus bar current is too high, or the grid power provider has indicated that the AC electrical grid is overloaded, or the voltage or frequency of the grid is outside an allowed range, or the price of electricity is high at the particular time of day. In any of these situations, the central controller sends commands over the serial digital interface to one or both of the power control modules 130 to turn off loads, starting with the least important to the user, until the situation is resolved. It would be clear to those skilled in the art that the load or loads would be reduced to the least of the rating of the AC grid circuit breaker 105, the requested reduced load from the grid power provider, or a configured minimum load when the voltage or frequency of the grid is outside an allowed range or when electricity is expensive.

An advantage of locating the power control modules 130 before the circuit breakers 125 and not after is because the power control modules have two power inputs and six outputs. If the power control modules were after the circuit breakers, they would require six inputs and six outputs and would increase the system cost.

Figure 10:
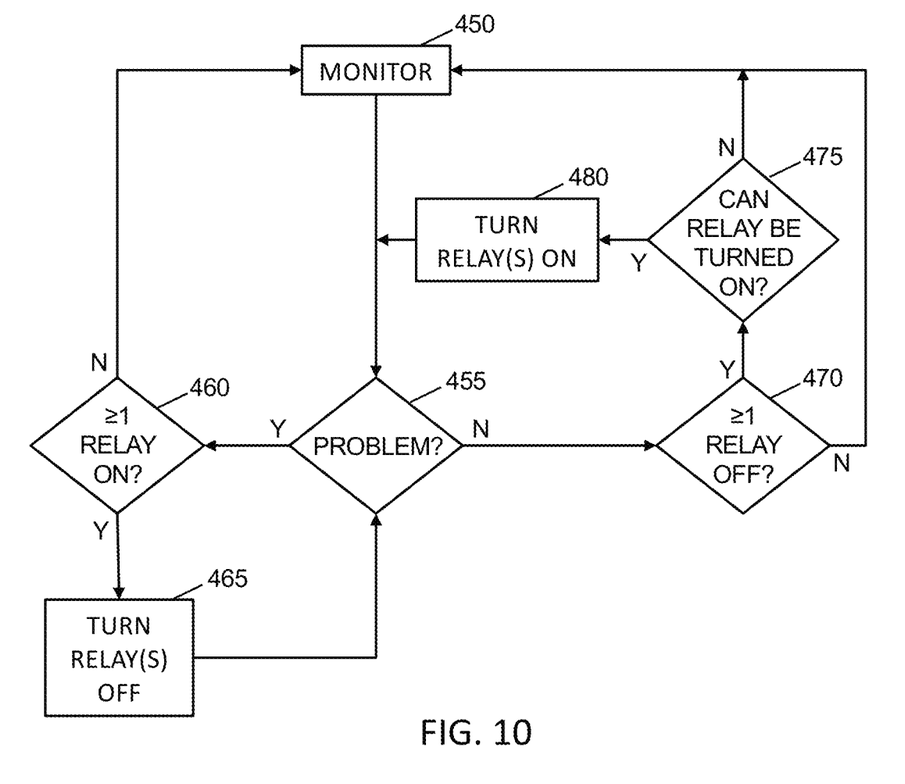
FIG. 10 is a flowchart of a process carried out by an electrical panel, according to an embodiment of the present invention.

FIG. 10 shows an exemplary flow chart of a method that the system undertakes to control the power usage. In other embodiments, other logic flow may be implemented to achieve the same or similar result. In step 450, the method starts by the system beginning to monitor the total current drawn by the panel and information about the operational status of the AC supply grid. In step 455, the system determines whether there is a problem. The problem may be that the total bus bar current is too high, the AC electrical grid is overloaded, or the voltage or frequency of the grid is outside an allowed range. In other embodiments, the problem may be that the panel is unnecessarily drawing power at a time when the power is more expensive than at other times, and the power could be drawn instead at these other times without inconvenience to the user.

If there is a problem, the method moves to step 460, in which it is determined whether there is at least one of the relays 215 switched on. If at least one of the relays is switched on, then in step 465, one of the relays is turned off. In some embodiments, more than one of the relays are turned off at the same time. After one or more of the relays have been turned off, the process returns to step 455, in which it is again determined as to whether there is a problem. If, for example, the problem was initially that the overall current drawn by the panel was too high, and only one of the relays was turned off in step 460, then it may be the case that the overall current is still too high. If so, the process cycles to step 460 to determine whether there is another relay that could be turned off. If so, it is turned off in step 465. If in step 460 there are no more relays that are switched on, the system reverts to monitoring step 450. There may be some other problem that cannot be remedied by turning off the relays, which may lead to the tripping of the other, directly connected circuit breakers or the AC grid circuit breaker 105.

Returning to step 455, if there is no problem, or no longer a problem, then the system determines whether at least one of the relays is switched off, in step 470. If none of the relays are switched off, and there is no problem, then the process reverts to monitoring step 450. If, however, there is at least one relay that is turned off, then the system determines in step 475 whether it and optionally any other relays can be turned on. The determination may be made based on the additional current expected to be drawn by the panel when each relay is switched on, and whether this would raise the total current drawn by the panel above its rated threshold. The determination may also be made based on the grid returning to its permitted voltage and frequency range, or ceasing to be overloaded. If one or more of the relays can be turned on safely, i.e. without the total current passing through the energized bus bars exceeding the threshold, then one or more of them are switched on in step 480. The process then continues to step 455, to check whether the switching on of the relay has caused a problem.

Figure 11:
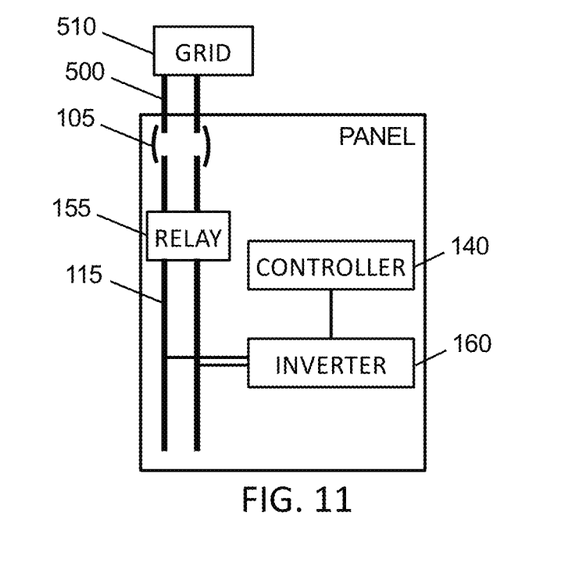
FIG. 11 is a schematic diagram of an electrical panel with an inverter, according to an embodiment of the present invention.

In some embodiments, FIG. 11 shows that the system further includes a relay 155 to completely disconnect the bus bars 115 from the AC grid circuit breaker 105 and indirectly from the AC grid 510. The system further includes an inverter 160 to convert DC voltage to AC so as to power the bus bars indirectly from the DC source. The DC-AC power inverter 160 may be included in the electrical panel, connected to the energized bus bars 115. The inverter 160 may be used to supply the loads that are connected to the panel when the panel is isolated from the electrical grid. The inverter may be powered by a rechargeable battery, generator, or solar panel, for example. The controller 140 controls the inverter as and when required. In other embodiments, the inverter may be located outside of the panel.

C. Variations

Embodiments, depending on their configuration, may exhibit all or fewer than all of the features described herein. Other features not mentioned may be present in one or more of the embodiments. Features from any of the embodiments may be combined with features from any of the other embodiments to form another embodiment within the scope of the invention. Embodiments, depending on their configuration, may exhibit all or fewer than all of the advantages described herein.

The detailed description has been presented partly in terms of methods or processes, symbolic representations of operations, functionalities and features of the invention. These method descriptions and representations are the means used by those skilled in the art to most effectively convey the substance of their work to others skilled in the art. A software implemented method or process is here, and generally, understood to be a self-consistent sequence of steps leading to a desired result. These steps require physical manipulations of physical quantities. Often, but not necessarily, these quantities take the form of electrical or magnetic signals or values capable of being stored, transferred, combined, compared, and otherwise manipulated. It will be further appreciated that the line between hardware and software is not always sharp, it being understood by those skilled in the art that the software implemented processes described herein may be embodied in hardware, firmware, software, or any combination thereof. Such processes may be controlled by coded instructions such as microcode and/or by stored programming instructions in one or more tangible or non-transient media readable by a computer or processor. The code modules may be stored in any computer storage system or device, such as hard disk drives, optical drives, solid-state memories, etc. The methods may alternatively be embodied partly or wholly in specialized computer hardware, such as ASIC or FPGA circuitry.

It will be clear to one having skill in the art that further variations to the specific details disclosed herein can be made, resulting in other embodiments that are within the scope of the invention disclosed. Two or more steps in the flowchart may be performed in a different order, other steps may be added, or one or more may be removed without altering the main outcome of the process or function of the invention. Modules may be divided into constituent modules or combined into larger modules, although there will be at least one serial digital communications cable 135 or removable connecting conductors between the modules. Communications between the modules may be encrypted in some embodiments. All parameters, proportions, quantities and configurations described herein are examples only and may be changed depending on the specific embodiment implemented. Unless otherwise indicated, singular elements may be in the plural and vice versa with no loss of generality.

Throughout the description, specific details have been set forth in order to provide a more thorough understanding of embodiments of the invention. However, the invention may be practised without these specific details. In other instances, well known elements have not been shown or described in detail and repetitions of steps and features have been omitted to avoid unnecessarily obscuring the invention. Accordingly, the specification and drawings are to be regarded in an illustrative, rather than a restrictive, sense. It will be clear to one having skill in the art that variations to the details disclosed herein can be made, resulting in other embodiments that are within the scope of the invention disclosed. Accordingly, the scope of the invention is to be construed in accordance with the substance defined by the claims.

The invention claimed is:

1. An electrical panel comprising:
   a first insulating panel;
   a second insulating panel different from the first insulating panel;
   an energized bus bar, affixed to the first and second insulating panels;
   a current monitoring module comprising a sensor to measure a current in the energized bus bar, the current monitoring module removably connected to the energized bus bar in front of the first insulating panel;
   a plurality of circuit breakers affixed to and in front of the second insulating panel;
   a power control module comprising:
      a secondary conductor;
      a plurality of relays each connected to the secondary conductor; and
      for each relay, a circuit conductor;
      wherein the power control module is removably connected via the secondary conductor to the energized bus bar in front of the second insulating panel, and via each of the circuit conductors to a different one of the circuit breakers; and
   one or more disconnectable communication lines connecting the current monitoring module, the power control module and a controller that causes the relays to switch on and off.

2. The electrical panel of claim 1, wherein:
   the relays are electromechanical or solid-state;
   the energized bus bar is completed by the current monitoring module and/or passes through the current monitoring module;
   each circuit conductor is a discrete conductor, part of one of the relays or part of one of the circuit breakers;
   the one or more disconnectable communication lines are in one or more serial digital interface cables; and
   the controller is inside the electrical panel and comprises:
      a processor;
      a computer-readable memory storing computer-readable instructions, which, when executed by the processor, cause the relays to switch on and off depending on the current in the energized bus bar; and
      a serial digital interface connector that connects to the one or more disconnectable communication cables.

3. The electrical panel of claim 1, further comprising electrical connectors mounted on the second insulating panel, each electrical connector connecting to one of the circuit breakers and one of the circuit conductors.

4. The electrical panel of claim 1, wherein the controller comprises a wireless communications interface connected to receive information about an AC power grid to which the electrical panel is connected and a priority in which to switch off each relay.

5. The electrical panel of claim 1, further comprising one or more additional current sensors for measuring current flowing through the secondary conductor.

6. The electrical panel of claim 1, wherein all or a majority of the secondary conductor is inside the power control module.

7. The electrical panel of claim 1, further comprising additional current sensors each of which measure current flowing through a different one of the circuit conductors.

8. The electrical panel of claim 1, wherein the power control module comprises:
   another secondary conductor;
   a plurality of other relays each connected to the other secondary conductor; and
   for each other relay, another circuit conductor;
   wherein:
   the relays have connections that face in one direction; and
   the other relays have connections that face opposite to said one direction.

9. The electrical panel of claim 8, wherein:
   the circuit conductors each extend from a different one of the relays to a first terminal via which the circuit breakers are connected; and
   the other circuit conductors each extend from a different one of the other relays, bending around an edge of a circuit board to which the other relays are mounted and spanning a height of any one of said other relays, to a second terminal via which other circuit breakers are connected;
   wherein the first terminals and second terminals are aligned in a row.

10. The electrical panel of claim 9, wherein the power control module comprises:
    a second circuit board on which the relays are mounted; and
    a third circuit board on which a processor and a serial digital interface connector are mounted;
    wherein:
    the serial digital interface connector is configured to connect with one of the one or more disconnectable communication lines; and
    the processor commands the relays to switch on and off based on instructions received from the controller.

11. The electrical panel of claim 1, wherein the power control module is located to a side of the plurality of circuit breakers.

12. The electrical panel of claim 1, further comprising:
    a third insulating panel different from the first and second insulating panels, wherein the energized bus bar is affixed to the third insulating panel; and
    another plurality of circuit breakers affixed to and in front of the third insulating panel and electrically connected directly to the energized bus bar.

13. The electrical panel of claim 1, further comprising:
    a third insulating panel the same as the second insulating panel, wherein the energized bus bar is affixed to the third insulating panel;

a plurality of other circuit breakers affixed to and in front of the third insulating panel; and another power control module comprising:
- another secondary conductor;
- a plurality of other relays each connected to the other secondary conductor; and
- for each other relay, another circuit conductor;
- wherein the other power control module is removably connected via the other secondary conductor to the energized bus bar in front of the third insulating panel, and via each of the other circuit conductors to a different one of the other circuit breakers.

14. The electrical panel of claim 1, wherein the current monitoring module further comprises:
- a voltage sensor connected to measure a voltage of an AC power grid connected to the electrical panel; and
- a frequency sensor connected to measure a frequency of the AC power grid;
- wherein the controller is configured to switch the relays on and off depending on one or more of the voltage, the frequency and the current in the energized bus bar.

15. The electrical panel of claim 1, further comprising:
- another relay located to isolate the electrical panel from an AC power grid to which the electrical panel is connected; and
- a power inverter that powers the energized bus bar when the electrical panel is isolated from the AC power grid.

16. The electrical panel of claim 15 wherein the other relay is in the current monitoring module.

17. The electrical panel of claim 1, further comprising:
- another energized bus bar affixed to the first and second insulating panels; and
- a plurality of other circuit breakers affixed to and in front of the second insulating panel;

wherein the power control module comprises:
- another secondary conductor;
- a plurality of other relays each connected to the other secondary conductor; and
- for each other relay, another circuit conductor;
- wherein the power control module is removably connected via the other secondary conductor to the other energized bus bar in front of the second insulating panel, and via each of the other circuit conductors to a different one of the other circuit breakers.

18. The electrical panel of claim 1, wherein the controller is in the current monitoring module.

19. The electrical panel of claim 1, wherein the current monitoring module comprises a power supply.

20. The electrical panel of claim 1, further comprising another disconnectable communication line, which connects the power control module to a load that is connected to one of the circuit breakers.

* * * * *